United States Patent [19]

Moore

[11] Patent Number: 4,812,610
[45] Date of Patent: Mar. 14, 1989

[54] ADAPTOR FOR CONVERTING OXY-FUEL CUTTING TORCHES TO EXOTHERMIC CUTTING

[75] Inventor: Paul E. Moore, Glouster, Ohio

[73] Assignee: Arcair Company, Lancaster, Ohio

[21] Appl. No.: 23,335

[22] Filed: Mar. 9, 1987

[51] Int. Cl.[4] .............................................. B23K 9/28
[52] U.S. Cl. ........................................ 219/70; 219/74; 266/48
[58] Field of Search ............................ 266/48, 66, 75; 219/69 R, 68, 70, 69 E, 136, 138; 229/48, 51

[56] References Cited

U.S. PATENT DOCUMENTS

| 1,028,166 | 6/1912 | Whitford | 266/66 |
| 1,037,979 | 9/1912 | Perkins | 219/70 |
| 1,474,957 | 11/1923 | Dorsey | 266/66 |
| 2,173,484 | 9/1939 | Lerch et al. | 266/48 |
| 2,416,278 | 2/1947 | Austin et al. | 219/70 |
| 2,417,650 | 3/1947 | Kandel | 219/70 |
| 2,465,157 | 3/1949 | Isbell | 219/70 |
| 2,534,363 | 12/1950 | Meincke | 266/75 |
| 2,685,631 | 8/1954 | Scheller | 279/48 |
| 3,215,811 | 11/1965 | Kroy et al. | 279/48 |
| 4,049,943 | 9/1977 | Pratt | 219/74 |
| 4,142,086 | 2/1979 | Rotillo | 219/74 |
| 4,182,947 | 1/1980 | Brower | 219/70 |
| 4,192,488 | 3/1980 | Roeder et al. | 266/48 |
| 4,361,746 | 11/1982 | Johnson et al. | 219/70 |
| 4,391,209 | 7/1983 | Moore | 110/349 |
| 4,461,948 | 7/1984 | Watts | 279/51 |
| 4,573,665 | 3/1986 | Strohl et al. | 266/48 |
| 4,597,563 | 7/1986 | Persbeck | 219/70 |

Primary Examiner—A. D. Pellinen
Assistant Examiner—Geoffrey S. Evans
Attorney, Agent, or Firm—James C. Simmons

[57] ABSTRACT

The cutting tip of a conventional oxy-fuel cutting and welding torch is replaced by the adaptor of the invention to convert the torch for using exothermic cutting rods or electrodes for erothermic cutting.

7 Claims, 2 Drawing Sheets

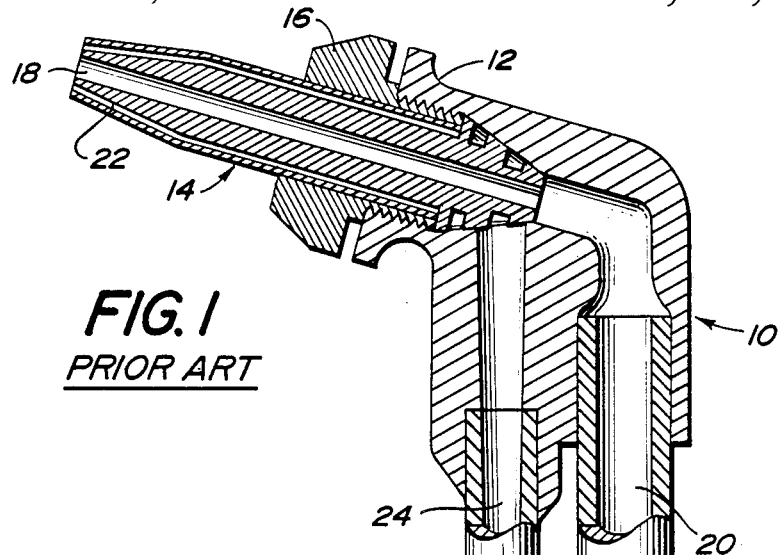
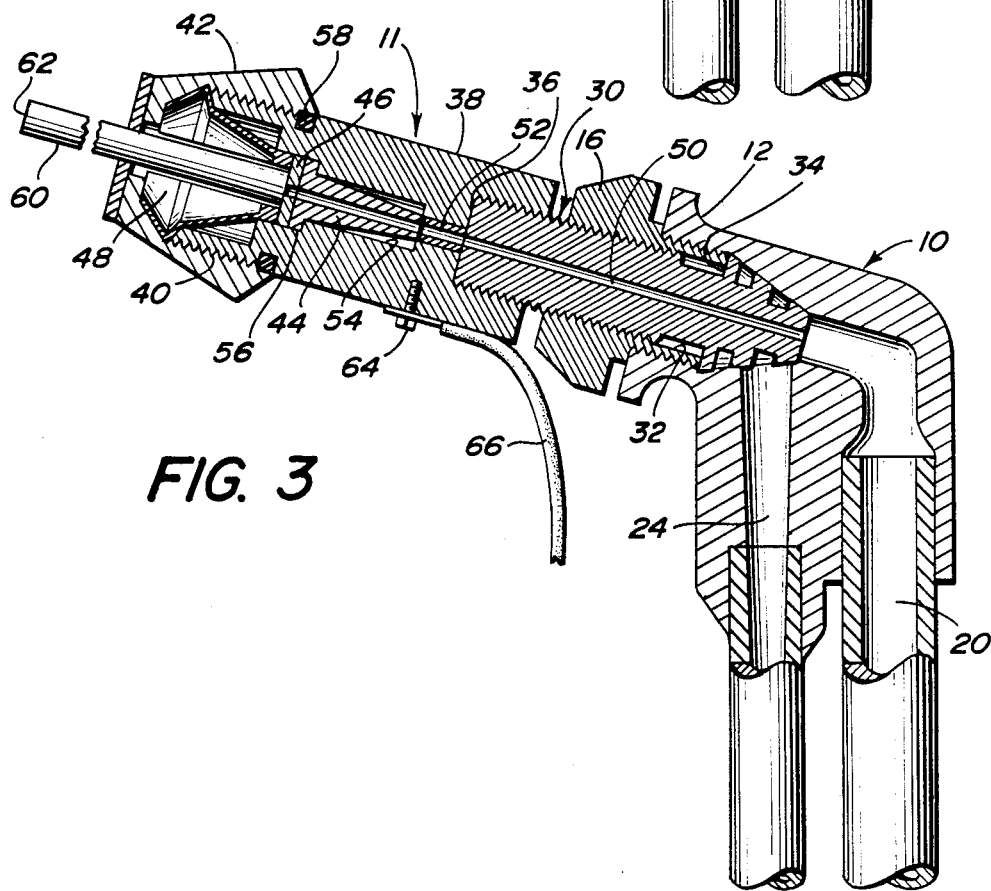

ADAPTOR FOR CONVERTING OXY-FUEL CUTTING TORCHES TO EXOTHERMIC CUTTING

TECHNICAL FIELD

The present invention pertains to exothermic cutting using an electrode or burning bar of the type wherein a mass of metal is ignited in the presence of an oxidizing gas (e.g. oxygen) to form a flame or products of combustion which can be directed at a structural shape for cutting or piercing of the structural shape. In particular the invention relates to means for adapting a conventional oxy-fuel cutting and welding torch to utilizing the exothermic electrode or rod for cutting.

BACKGROUND OF THE PRIOR ART

Conventional burning bars which are used on land are generally made from large diameter pipe or tubing which is used to contain the plurality of elongated rods or wires to make up a mass of oxidizable metal. Oxygen is conducted down a tube to the end of the rod where combustion is initiated to produce a flame which is directed at a structural material, e.g. concrete, for cutting or piercing. The prior art is to exothermic cutting electrodes is adequately described in U.S. Pat. Nos. 4,391,209 and 4,437,691 the specifications of which are incorporated herein by reference. In addition U.S. Pat. No. 4,573,665 discloses and claims a self-contained exothermic cutting system which includes a specialized torch or electrode holder. The torch or electrode holder is adapted to grip an exothermic electrode and to conduct electrical current to the electrode as well as the source of oxidizing fluid (e.g. oxygen). One particular type of exothermic torch is disclosed in U.S. patent application No. 636,524 filed Aug. 1, 1984 relating to a design for a "Torch for Exothermic Cutting Electrodes." U.S. patent application No. 636,531 filed Aug. 1, 1984 relating to a design for a "Striker for Exothermic Cutting Electrodes" is representative of a device which can be used in conjunction with the torch and a source of current for initiating the exothermic reaction. A complete line of exothermic cutting equipment is available from the Arcair Company of Lancaster, Ohio.

Conventional oxy-fuel cutting and welding torches are in common use throughout the United States. The torch is a ready means for delivering cutting oxygen through a tip which includes means to preheat the work being cut so that cutting can take place by means of the heat and the large volume of oxygen directed at the workpiece. Conventional oxy-fuel torches cannot readily be adapted for exothermic cutting using only a mass of oxidizable metal and oxygen.

BRIEF SUMMARY OF THE INVENTION

The present invention relates to an adaptor for converting an oxy-fuel cutting and welding torch to hold and position an exothermic cutting electrode so that in the presence of oxygen conducted through the conventional oxy-fuel cutting torch to the exothermic electrode the exothermic reaction can be initiated either through an electrical current produced by putting the adaptor in circuit with the workpiece or with a striker or utilizing an external flame to initiate the reaction at the projecting end of the electrode.

BRIEF DESCRIPTION OF THE DRAWING

FIG. 1 is a fragmentary cross-sectional elevational view of the tip end of one type of conventional oxy-fuel cutting and welding torch.

FIG. 3 is a fragmentary partial cross-sectional view in elevation of the device of the present invention fitted to the torch of FIG. 1.

DETAILED DESCRIPTION OF THE PREFERRED EMBODIMENT

Figure 2:
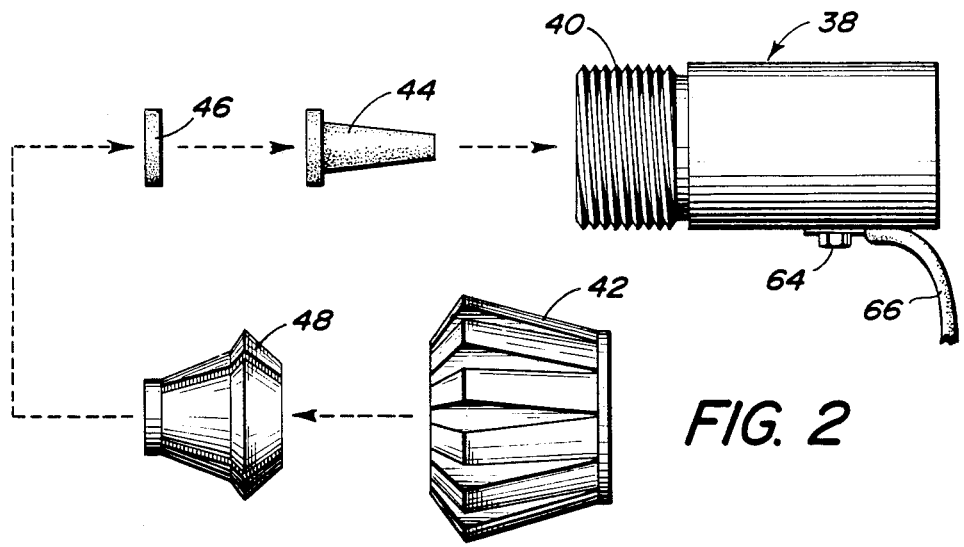
FIG. 2 is an exploded view of the adaptor according to the present invention.

Referring to FIG. 1 of the drawing one type of conventional oxy-fuel cutting torch shown as 10 includes a head 12 adapted to position a conventional torch tip 14 by means of a torch tip or head nut 16. The torch tip 14 has a central cutting oxygen passage 18 which is adapted to be held in fluid tight communication with a cutting oxygen passage 20 in the torch 10. Torch tip 14 includes a plurality of preheat passages 22 which are adapted to be held in fluid tight communication with a cutting mixture passage 24 in torch 10. The cutting mixture passage 24 permits an oxy-fuel mixture (e.g. oxygen and acetylene) to be conducted to the preheat passages for ignition. The preheat flame (not shown) preheats the underlying metal which is cut or burned through by the combination of the preheat in conjunction with the high pressure oxygen stream emanating from the central passage 18 of the tip 14. Such torches and tips come in many forms but all perform in the same manner, namely, the use of a preheat flame and high pressure oxygen to perform through cutting of structural materials mostly ferrous materials. A conventional oxy-fuel cutting torch cannot be used to cut certain non-ferrous metals and absent an additional source of consumable iron to cut or pierce concrete.

Referring to FIG. 3 there is shown the conventional torch tip nut 16 such as shown in FIG. 1. The device of the present invention includes a torch nut adaptor 30 which has a first end 32 which is fabricated so as to be fixed to the conventional torch head in the conventional manner. End 32 of torch nut adaptor 30 can be made in the required configuration of any conventional oxy-fuel cutting tip as dictated by the particular oxy-fuel torch for which the exothermic electrode adaptor is to be used. Torch nut adaptor 30 includes a flange 34 which will bear against the bottom of the collet nut 16 so that it can be held firmly in the oxy-fuel cutting torch. A second end 36 of torch nut adaptor 30 is provided with suitable threads so that it can be securely threaded to collet nut adaptor 38. Collet nut adaptor 38 contains an internal passage with threads complementry to the threaded portion 36 of torch nut adaptor 30 on a first end and a second end containing external threads 40 which are adapted to receive a molded collet nut 42. Internally of collet nut adaptor 38 the passage is suitably bored and counter bored so that a flashback arrestor 44 washer 46 and collet 48 can be assembled inside of the collet nut adaptor 38 and held in place by the collet nut 42 as is shown in FIG. 2 and FIG. 3. The use of the collet and flashback arrestor as well as washer is illustrated in U.S. Pat. No. 4,361,746 which discloses an underwater cutting and welding torch. The collet, washer and flashback arrestor of the present invention are similar to those of the U.S. Pat. No. 4,361,746. Thus the adaptor of the present invention includes in its basic form the torch nut adaptor 30, collet nut adaptor 38, collet 48 and molded collet nut 42. A fully assembled exothermic electrode adaptor is shown as 11 in FIGS. 3 and 4.

Referring to FIG. 3 the oxy-fuel torch 10 has been fitted with exothermic electrode adaptor 11 by having the torch nut adaptor 30 placed inside the head of torch 10 and held in place by the torch tip nut 16. As shown in FIG. 3 the torch nut adaptor 30 is designed so that the cutting oxygen passage 20 of torch 10 communicates with a central bore or passage 50 in torch nut adaptor 30. Torch nut adaptor 30 is further adapted to seal off the preheat oxy-fuel cutting mixture passage 24 so any gases inadvertently in this passage are not conducted into the adaptor 30 or exit from the torch 10.

Collet nut adaptor 38 is securely threaded to torch nut adaptor 30. Collet nut adaptor 38 includes a central passage 52 which is a continuation of the passage 50 in torch nut adaptor 30. On the forward end 40 of collet nut adaptor 38 the central passage 52 has been provided with counterbores 54, 56 to position the flashback arrestor 44. Collet nut 42 includes a suitable internal passage to position collet 48 so that an exothermic electrode 60 can be positioned for producing combustion at its distal or projecting end 62. Collet nut 41 is constructed so that washer 46 is positioned at the forward end of collet nut adaptor 38 to provide a positive seal between the end of the electrode 60 and forward end 40 of collet nut adaptor 38. "0" ring 58 is provided in a suitable annular recess in collet nut 42 to prevent oxygen leakage between adaptor 38 and collet nut 42. An electrical cable 66 can be fixed to collet nut adaptor 38 by suitable means such as set screw 64. The outer surface of collet nut adaptor 38 can be covered by an insulating boat or the like (e.g. electrical type) to minimize the parts exposed to inadvertent electrical contact.

Figure 4:
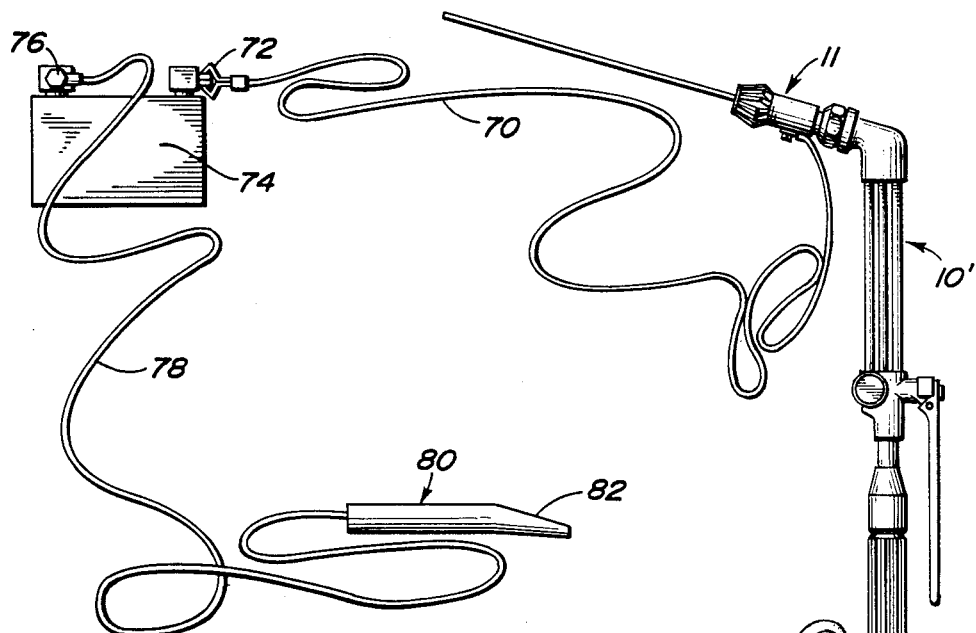
FIG. 4 is a diagrammatic representation of the adaptor of the present invention incorporated into a system suitable for exothermic cutting.

Referring to FIG. 4 a different type oxy-fuel cutting and welding torch 10' is shown with the exothermic adaptor 11 in place. The exothermic adaptor 11 can be connected by a suitable electrical conduit 70 to the positive terminal 72 of a conventional storage battery 74. The negative terminal 76 of the conventional battery 74 can be connected by a suitable electrical conduit 78 to a striker 80 so that when an electrode is placed inside the exothermic adaptor 11 and the electrical connections are made as shown, oxygen is admitted down through the electrode and the electrode brought in contact with the conductive portion 82 of Striker 80 the exothermic reaction can be initiated. After initiation of the reaction the torch can be conveniently pointed at a workpiece for cutting such as shown and described in U.S. Pat. No. 4,573,665 the specification of which is incorporated herein by reference.

While one particular mechanical arrangement of the exothermic electrode adaptor 11 has been shown and described above it is believed that other embodiments can be accomplished without departing from the spirit and scope of the present invention.

Having thus described my invention what is desired to be secured by Letters Patent of the United States is set forth in the appended claims.

I claim:

1. An apparatus for performing exothermic cutting comprising in combination:

an oxy-fuel cutting and welding torch, said torch including a head;
an exothermic cutting electrode;
a collet nut adaptor connected to said head of said oxy-fuel torch and adapted to receive and hold said exothermic electrode for performing a cutting operation; said collet nut adaptor including means to pass oxygen from said torch to said electrode; and said collet nut adaptor further including terminal means to facilitate supply of electricity to said electrode from an electrical power source.

2. The apparatus according to claim 1 wherein the collet nut adaptor is further defined as having:

a first end of said collet nut adaptor provided with first means to removably secure said adaptor to said oxy-fuel torch said first means constructed to conduct oxygen from said torch to the interior of said collet nut adaptor;
a second end of said collet nut adaptor having means to removably hold one end of a generally elongated exothermic cutting electrode having at least one passage therethrough to conduct oxygen from said torch to said electrode; and
second means on said collet nut adaptor to facilitate conduction of electrical current through said collet nut adaptor to said electrode.

3. The apparatus according to claim 1 wherein said second means includes a collet removably axially aligned to said second end of said collet nut adaptor.

4. The apparatus according to claim 1 wherein said collet nut adaptor includes means to prevent flashback into said torch said means positioned between said electrode holding means and first end of said collet nut adaptor.

5. The apparatus according to claim 2 including means to positively seal said one end of said electrode to said passage in said collet nut adaptor.

6. The apparatus according to claim 2 wherein said first means is an integral portion of said collet nut adaptor in the form of the torch end of an oxy-fuel torch tip for the oxy-fuel cutting and welding torch for which the adaptor is to be used.

7. An adaptor for permitting a conventional oxy-fuel torch to be used for exothermic cutting comprising in combination:

an elongated generally cylindrical electrically conductive body;
a first end of said body provided with first means to removably secure said adaptor to said oxy-fuel torch said first means constructed to conduct oxygen from said torch to the interior of said cylindrical body and being in the form of the torch end of said oxy-fuel torch;
a second end of said body having means to hold a collet axially aligned to said second end of said body to removably hold one end of a generally elongated exothermic cutting electrode having at least one passage therethrough to conduct oxygen from said torch to said electrode, said collet including means to positively seal one end of said electrode to said cylindrical bore in said body;
second means on said body to permit said body to be connected to a source of electrical current in order to conduct electrical current through said body to said electrode; and
means in said body to prevent flashback into said torch said means positioned between said electrode holding means and said first end of said body.

* * * * *